Nov. 26, 1935.   S. F. OSSING   2,022,146
LOADER
Filed July 30, 1932   2 Sheets-Sheet 1
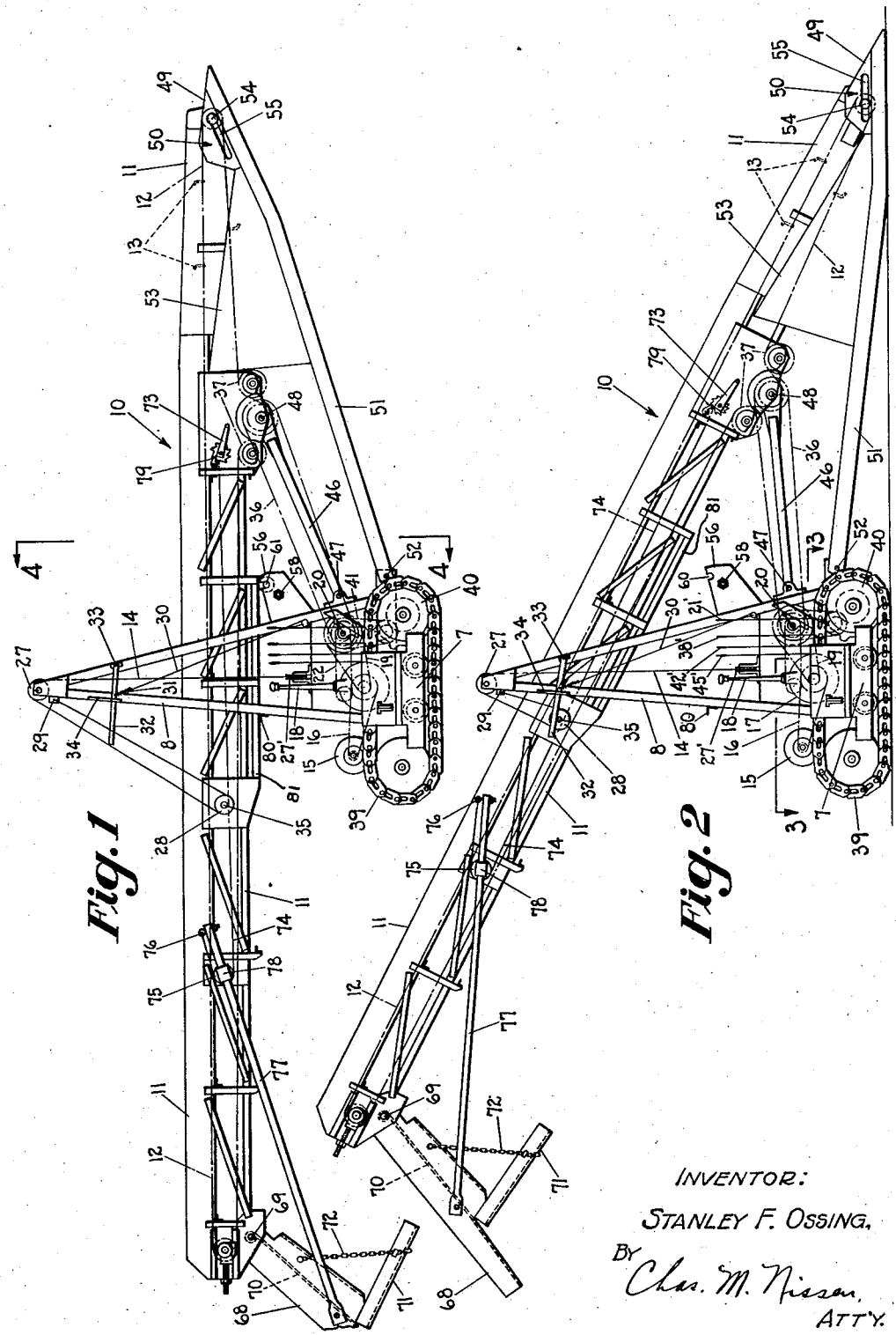
INVENTOR:
STANLEY F. OSSING,
By Chas. M. Nissen,
ATTY.

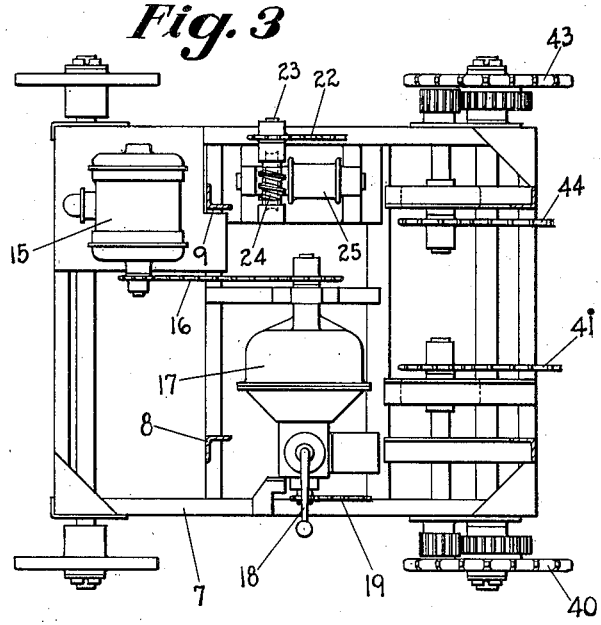

Patented Nov. 26, 1935

2,022,146

UNITED STATES PATENT OFFICE 2,022,146

LOADER

Stanley F. Ossing, Columbus, Ohio, assignor to The Jeffrey Manufacturing Company, a corporation of Illinois Application July 30, 1932, Serial No. 626,907

7 Claims. (Cl. 198—233)

The present invention relates to loaders of a portable type and one of its objects is the provision of new and useful improvements for supporting the conveyor unit of the loader in elevated position during transportation.

More particularly, it is the object of the present invention to provide a detachable support for the conveyor unit of the loader in position to cooperate with connections between the forward portion of the conveyor unit and the supporting framework to permit the center of gravity of the conveyor unit to occupy such a position that the conveyor unit will be automatically held in elevated position during transportation.

A further object of the invention is the provision of automatic limit stop mechanism for hoisting mechanism connected between supporting framework and an adjustable conveyor unit.

Other objects of the invention will appear hereinafter, the novel features and combinations being set forth in the appended claims.

In the accompanying drawings Fig. 1 is a side elevational view of the loader arranged for transportation;

Fig. 2 is a side elevational view of the loader in position for operation;

Fig. 3 is a sectional plan view on the line 3—3 of Fig. 2;

Fig. 4 is a sectional view taken on the line 4—4 of Fig. 1 looking in the direction of the arrows;

Fig. 5 is a view partly in section, of the intermediate portion of the power transmission mechanism for the travelling conveyor on the conveyor unit; and Fig. 6 is an enlarged plan view of the removable transverse supporting bar for the conveyor unit when in the transportation position shown in Fig. 1.

Referring to Figs. 1 and 2, 7 designates a supporting tractor of the crawler type upon the frame of which are mounted spaced-apart masts 8 and 9. The masts 8 and 9 are sufficiently spaced apart to permit free up and down movement between the same of the conveyor unit 10 which comprises a conveyor frame 11 with an endless travelling conveyor 12 mounted thereon and comprising spaced-apart cross-flights 13, 13. Hoisting mechanism on the frame of the crawler tractor unit comprises two hoisting ropes or cables 14 connected to opposite sides of the conveyor frame 11 intermediate the ends of the latter as shown in Figs. 1 and 2. As shown in Fig. 3 a reversible motor 15 is connected by sprocket gearing 16 to variable speed transmission gearing in the housing 17 and controlled by the gear shift lever 18. Sprocket gearing 19 connects the variable speed transmission gearing to the countershaft 20 which is located in the position shown in Figs. 1 and 2.

At that end of the countershaft 20 opposite the sprocket gearing 19 is a jaw clutch 21 for controlling the connection of the countershaft 20 by means of the sprocket gearing 22 to the shaft 23 which is connected by the worm gearing 24 to the hoisting drum 25. The two ropes or cables 14 are connected to and wound on the hoisting drum 25. One of the ropes or cables extends directly upward from the hoisting drum 25 and is reeved over the supporting pulley 26 shown in Fig. 4. The other hoisting rope or cable 15 is extended upwardly in an inclined direction toward the opposite side of the machine and is reeved under the direction pulley 27' as shown in Figs. 1 and 2. From the pulley 27' the hoisting rope 14 extends upwardly adjacent the mast 8 and is reeved over the supporting pulley 27. From the supporting pulleys 26 and 27 the ropes 14 extend downwardly and are reeved around the suspension pulleys 28 as shown in Figs. 1 and 2 and the ends of the ropes are then connected to the masts as illustrated at 29 in Figs. 1 and 2.

The clutch 21 may be operated by means of the lever 21' which is connected by means of the rope 30 to a spring 31 which in turn is connected to the lever 32 pivoted at 33 to the mast 8. The lever 32 may have a limited swinging movement on the pivot 33 in a slot in the bracket 34. When the hoisting mechanism is operated to lift the discharge end of the conveyor unit to the position shown in Fig. 2 the shaft 35 of the pulley 28 will strike the lever 32 to exert a pull on the rope 30 and automatically move the lever 21' to a position where the clutch 21 will be released and the hoisting drum 25 stopped. The overhanging weight of the discharge end of the conveyor will then be supported by the hoisting ropes since the hoisting drum 25 will be automatically locked by the self-locking worm gearing 24. Sprocket gearing 36 is connected between the countershaft 20 and the mechanism shown at 37 for driving the endless travelling conveyor 12. A clutch 38 operated by a lever 38' controls the driving of the travelling conveyor 12.

The crawler tractor mechanism may be separately operated on opposite sides of the machine so as to enable the direction of travel of the loader to be varied as it is desired. The endless crawler tread 39 shown in elevation in Figs. 1 and 2 may be operated by the sprocket 40 shown in Figs. 1, 2 and 3. The power transmission mechanism for the sprocket 40 comprises the sprocket gearing 41 which is controlled by a clutch 42 and the latter may be operated by the lever 42'. In a similar manner the endless crawler tread on the opposite side of the machine may be operated by the sprocket 43, the power transmission mechanism for which comprises the sprocket gearing 44 controlled by the clutch 45, the latter being operated by the lever 45'. By throwing in the clutch 42 the crawler tread 39 may be operated to swing the loader in one direction while the clutch 45 is released. By throwing in the clutch 45 while the clutch 42 is released the crawler tread on the opposite side of the machine may be operated to swing the loader in the opposite direction. By throwing in both of the clutches 42 and 45 at the same time the loading machine may be moved either forwardly to advance the receiving end of the conveyor unit into the material to be loaded or to retract such receiving end from the pile of loose material.

In order to resist the backward thrust on the conveyor unit when the loader is in the loading position shown in Fig. 2 and the receiving end of the conveyor unit 10 is forced into a pile of loose material to be loaded, a pair of thrust rods 46 are pivoted at their rear ends at 47 to the lower ends of the masts 8 and 9 and the forward ends are pivoted at 48 to the lower side of the conveyor frame 11 between the receiving end of the conveyor unit and the center of gravity thereof. Preferably when the machine is in the position shown in Fig. 2 the pivots 47 and 48 are in a plane extending through the axis 20. It will thus be seen that the strut rods 46 are so associated with the sprocket gearing 36 as to maintain the latter taut through a wide angle of adjustment of the elevation of the receiving end of the conveyor unit. Operation of the travelling conveyor 12 may therefore be maintained by power from the reversible motor 15 on the frame 7 when the receiving end of the conveyor is adjacent the surface on which the crawler treads are supported and also when the receiving end is elevated to various positions to enable the loader to be pushed into upper portions of a pile of loose material to be loaded. In other words, by having the pivot 47 near the axis of the countershaft 20 and by having the pivot 47 in a plane which passes through the axis 20 and the pivot 48 when the loader is in the position shown in Fig. 2, the sprocket chain 36 will be sufficiently taut to maintain power transmission to the travelling conveyor 12 when the receiving end of the conveyor unit is elevated to various positions above the surface on which the loose material lies.

It should also be noted that when the receiving end of the conveyor unit is in its lowermost position at the surface of the ground on which the loader is supported the strut rods will be inclined upwardly and forwardly so that the rearward thrust due to pushing the conveyor into the pile of loose material, will be rearwardly and downwardly to prevent upward tilting of the forward end of the tractor frame 7.

In order to keep the forward receiving end of the conveyor unit adjacent the ground or surface on which the loose material lies and prevent riding of such receiving end over the pile of loose material, wedge plates 49 are connected by means of the pin and slot connections 50 to opposite sides of the forward end of the conveyor frame 11. The wedge plates 49 are in vertical planes at opposite sides of the receiving end of the conveyor unit and are connected to the forward end of the supplemental supporting frame 51 the rear end of which is pivoted at 52 to the crawler tractor frame 7 as shown in Figs. 1 and 2. Vertical guard plates 53 are mounted on opposite sides of the supplemental frame 51 back of the wedge plates 49 in position to protect the lower runs of the chains of the scraper conveyor 12 and to prevent material during loading operations from entering the space below the receiving end of the conveyor unit and between the sides of the frame 51. It is preferred to construct the pin and slot connections 50 so as to comprise laterally projecting pins 54 at the sides of the conveyor frame 11 and sliding in horizontal slots 55 so that the wedge-shaped shoes 49 will serve to support the forward receiving end of the conveyor unit adjacent the ground surface to provide freedom of movement of the cross-flights 13 when changing their directions of travel. It should be understood, however, that the supplemental frame 51 resists the thrust of only the wedge plates 49 when the loader is in the position shown in Fig. 2 and the receiving end of the conveyor unit is pushed into a pile of loose material to be loaded. The main thrust due to engagement of the travelling conveyor and the conveyor bed with the material to be loaded is resisted by the thrust rods 46. The inclination of the thrust rods 46 rearward and downward from the lower side of the conveyor unit will hold the front end of the crawler tractor in engagement with the ground by preventing upward tilting thereof. The forward end of the conveyor unit is limited in its downward movement relative to the masts 8 and 9 by the pins 54 engaging the left-hand ends of the slots 55 as viewed in Fig. 2.

In order to support the conveyor unit in the horizontal position shown in Fig. 1 for transportation I have provided forward extending bracket plates 56, 57 secured to the masts 8 and 9 respectively and bolted rigidly together by means of the bolt 58 and pipe 59 as shown in Fig. 4. In notches 60 in the bracket plates 56, 57 is adapted to be detachably mounted a transverse supporting rod 61 which is provided with anti-friction rollers 62, 63 mounted between abutments 64, 65 and 66, 67 as shown in Fig. 6. The anti-friction rollers 62 and 63 are preferably mounted so as to occupy positions at the inner sides of the plates 56 and 57 and so as to be directly under the lower lateral frame members of the conveyor frame 11.

When the removable supporting structure shown in Fig. 6 is placed in the notches 60 of the bracket plates 56 and 57 while the conveyor unit is in the position shown in Fig. 2 the abutments 64 and 66 which are secured to the rod 61 will serve to prevent end-wise movement of the rod 61 relative to the plates 66 and 67. Now when the hoisting mechanism is operated to pay out the hoisting ropes 14 the discharge end of the conveyor unit will be lowered on the pins 54 acting as a fulcrum until the conveyor frame 11 engages the anti-friction rollers 62 and 63 whereupon the overbalancing weight of the conveyor unit to the left of the notches 60 will serve to lift the receiving end of the conveyor unit to the position shown in Fig. 1 where the pins 54 engage the right-hand ends of the slots 55 and thereby prevent any further upward movement of the receiving end of the conveyor unit. It will thus be seen that by locating the transverse supporting rod 61 forwardly of the center of gravity of the tilting structure the discharge end of the conveyor unit may be let down with the assurance that the rollers 62 and 63 will act as a fulcrum about which the forward end of the conveyor unit will move upwardly until the pins 54 strike the forward ends of the slots 55. However, in the absence of the pin and slot connections 50 the hoisting ropes 14 could be relied on to hold the conveyor unit in horizontal position because of the interlocking worm gearing 24. It is preferred, however, to include the pin and slot connections 50 so that during transportation the tension on the ropes 14 may be relieved.

Furthermore, if desired, the rear end of the conveyor unit may be lowered by the hoisting mechanism until it is supported not only by the rollers 62, 63 and the rod 61 on the brackets 56, 57, but also by the cross-bar 80 secured to the rear sides of the masts 8 and 9 as shown in Figs. 1 and 2, with the center of gravity of the conveyor unit between the rod 61 and the cross-bar 80. In that event the tension on the hoisting ropes may be relieved and the rear portion of the frame 51 omitted leaving the wedge shoes 49 merely pivoted to the sides of the conveyor frame 11. The strut rods 46 may then be relied on to prevent longitudinal movement of the conveyor unit relative to the rod 61 and the cross-bar 80.

An abutment reinforcing frame 81 may be secured to the central portion of the conveyor unit 11 so as to span the under side thereof in position to engage the rollers 62, 63 and the cross-bar 80 at points spaced below the cross-flights 13, as shown in Fig. 1.

At the rear end of the conveyor unit 10 is a discharge chute 68 pivoted at 69 and provided with a screen 70 for directing the smallest particles of material to an auxiliary chute 71 which is connected by a chain 72 to the chute 68 as shown in Fig. 2.

By means of a lever 73 a winding drum may be operated to exert a pull on the rope 74 which is reeved around the pulley 75 and connected at 76 to one end of an adjusting rod 77. By exerting a pull on the rope 74 the rod 77 may be slid rearwardly through the swivelled support 78 which is mounted on both sides of the conveyor frame 11. A rearward thrust of the rod 77 will elevate the discharge end of the chute 68. Pawl and ratchet mechanism 79 may be provided adjacent the crank 73 to hold the rod 77 in adjusted position. When this pawl and ratchet mechanism is released the chute 68 may be adjusted to a lower position.

The delivery mechanism comprising the chutes 68 and 71 and the mechanism for adjusting the same from a position near the receiving end of the conveyor unit is not covered by the claims hereto appended but will be covered by claims in a separate application. The loader herein shown and described is disclosed in my co-pending application Ser. No. 546,851, filed June 25, 1931, for a Scraper loader, with the exception of the support 80, the bracket plates 56 and 57 and the supporting structure shown in Fig. 6, the present application being therefore directed to an improvement of the disclosure in said co-pending application.

Obviously those skilled in the art may make various changes in the details and arrangement of parts without departing from the spirit and scope of the invention as defined by the claims hereto appended, and I wish therefore not to be restricted to the precise construction herein disclosed.

Having thus described and shown an embodiment of my invention, what I desire to secure by Letters Patent of the United States is:

1. In conveyor apparatus, the combination with a supporting frame, of self-propelling mechanism therefor, an elongated conveyor unit comprising an endless conveyor, a supplemental frame pivoted at its rear end to the lower portion of said supporting frame, wedging shoes at the forward end of said supplemental frame, pin and slot connections between the forward end of said supplemental frame and the receiving end of said conveyor unit, thrust mechanism pivotally connected at its rear end to said supporting frame and at its forward end to said conveyor unit, power transmission mechanism associated with said thrust mechanism and extending from the supporting frame to said endless conveyor, hoisting mechanism for the conveyor unit, and an auxiliary transverse support on said supporting frame in position to be engaged by the lower side of said conveyor unit between the center of gravity thereof and the receiving end of said conveyor unit.

2. In conveyor apparatus, the combination with a supporting frame, of an elongated conveyor unit, a supplemental frame for slidably supporting the forward end of said conveyor unit, wedging shoes at the forward end of said supplemental frame, mechanism connecting the conveyor unit and said supporting frame in position to take the thrust when the receiving end of said conveyor is pushed into a pile of material to be loaded while said wedging shoes act to prevent such receiving end from riding up on the pile of material, means for adjusting the elevation of the discharge end of said conveyor unit, and an auxiliary support on said supporting frame in position to be engaged by said conveyor unit between its center of gravity and its receiving end to effect elevation of the receiving end of the conveyor unit when the discharge end is lowered while said thrust mechanism confines the center of gravity of the conveyor unit to a position rearwardly of said auxiliary support.

3. In conveyor apparatus, the combination with a supporting frame, of an elongated conveyor unit mounted thereon, a fulcrum support for said conveyor unit, means for effecting tilting adjustments of said conveyor unit on said fulcrum support, a thrust rod pivotally connected at its rear end to said frame and at its forward end to said conveyor unit intermediate the receiving end thereof and said fulcrum support, and means for limiting the tilting of said elongated conveyor unit, said means being pivoted at its rear end to said frame and having a pin and slot connection with the receiving end of said conveyor unit.

4. In conveyor apparatus, the combination with a supporting frame, of an elongated conveyor unit, a fulcrum support on said frame, means for effecting tilting of said conveyor unit on said fulcrum support, a thrust device pivotally connected at its rear end to said frame and at its forward end to said conveyor unit intermediate said fulcrum support and the receiving end of said conveyor unit, and a supplemental frame spaced from said thrust device and pivotally connected at its rear end to said frame and connected at its forward end to the receiving end of said conveyor unit to limit the tilting of the latter relatively to said frame.

5. In conveyor apparatus, the combination with a supporting frame, of an elongated conveyor unit, a transverse abutment on said frame beneath said conveyor unit to limit downward movement of the latter, a thrust rod pivotally connected at its rear end to said frame below said abutment and pivotally connected at its forward end to said conveyor unit between a vertical plane including said abutment and the receiving end of said conveyor unit, and a supplemental frame spaced below said thrust rod and pivotally connected at its rear end to the lower portion of said frame and pivotally connected at its forward end to the said receiving end of said conveyor unit, said thrust rod and said supplemental frame co-operating with said abutment to limit the downward movement of said receiving end of the conveyor unit relatively to said frame.

6. In conveyor apparatus, the combination with a supporting frame, of an elongated conveyor unit, a transverse abutment below said conveyor unit, hoisting mechanism for adjusting the discharge end of said conveyor unit, said abutment being adapted to serve as a tilting fulcrum for said conveyor unit when let down by said hoisting mechanism onto said abutment, a thrust rod pivoted at its rear end to said frame in fixed relation thereto and pivoted at its forward end to said conveyor unit in fixed relation thereto between a vertical plane including said abutment and the receiving end of said conveyor unit, a supplemental frame pivoted at its rear end to said frame, and pin and slot connections between the outer end of said supplemental frame and the receiving end of said conveyor unit.

7. In conveyor apparatus, the combination with a supporting frame, of a conveyor unit, means for adjusting the elevation of the discharge end of the conveyor unit, a fulcrum support adjacent the receiving end of the conveyor unit for effecting elevation of the receiving end of the conveyor unit, and means comprising a supplemental frame between the receiving end portion of the conveyor unit and the supporting frame together with a pin and slot connection between the supplemental frame and the receiving end of the conveyor unit for limiting the elevation of the receiving end.

STANLEY F. OSSING.